(12) United States Patent
Berstis

(10) Patent No.: US 6,490,575 B1
(45) Date of Patent: Dec. 3, 2002

(54) DISTRIBUTED NETWORK SEARCH ENGINE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,077

(22) Filed: Dec. 6, 1999

(51) Int. Cl.[7] ............................................. G06F 17/30
(52) U.S. Cl. ..................... 707/3; 707/10; 707/501.1; 707/511; 709/217
(58) Field of Search .......................... 707/1, 3, 5, 100, 707/104, 10, 501.1, 511; 709/217

(56) References Cited

U.S. PATENT DOCUMENTS

| | | | |
|---|---|---|---|
| 5,659,732 A | * | 8/1997 | Kirsch ............................. 707/5 |
| 5,745,899 A | | 4/1998 | Burrows ...................... 707/102 |
| 5,761,418 A | | 6/1998 | Francis et al. .......... 395/200.31 |
| 5,765,158 A | | 6/1998 | Burrows ...................... 707/101 |
| 5,878,423 A | * | 3/1999 | Anderson et al. .......... 707/100 |
| 5,913,215 A | * | 6/1999 | Rubinstein et al. ........... 707/10 |
| 6,018,733 A | * | 1/2000 | Kirsch et al. ................. 707/3 |
| 6,094,649 A | * | 7/2000 | Bowen et al. ................. 707/3 |
| 6,101,503 A | * | 8/2000 | Cooper et al. .............. 707/104 |
| 6,102,969 A | * | 8/2000 | Christianson et al. .......... 717/8 |
| 6,105,021 A | * | 8/2000 | Berstis ........................... 707/3 |
| 6,148,289 A | * | 11/2000 | Virdy ............................ 705/1 |
| 6,182,122 B1 | * | 1/2001 | Berstis ....................... 709/217 |
| 6,199,061 B1 | * | 3/2001 | Blewett et al. ................ 707/3 |
| 6,271,840 B1 | * | 8/2001 | Finseth et al. .............. 345/349 |
| 2001/0049674 A1 | * | 12/2001 | Talib et al. ..................... 707/1 |
| 2002/0087667 A1 | * | 7/2002 | Andersen ..................... 709/220 |

OTHER PUBLICATIONS

"A Reginal distributed WWW search and indexing service—the DESIRE way," Anders ArdÖand Sigfrid Lundberg, Computer Networks and ISDN Systems 30 (1998) pp. 173–183.

"Aleph Web: a search engine based on the federated structure," Gerard Rodriguez and Leandro Navarro, Proceedings of JENC7, 7th Joint European Networking Conference, Networking in The Information Society, 1996, pp. 111/10–113–1.

* cited by examiner

Primary Examiner—Charles L. Rones
(74) Attorney, Agent, or Firm—Leslie A. Van Leeuwen; Bracewell & Patterson, L.L.P.

(57) ABSTRACT

A method and system for facilitating a keyword search request initiated at a client station within a multilevel data network, wherein the multilevel data network includes multiple local sites each containing multiple data pages. Multiple keywords from each of the data pages within the local sites of the multilevel data network are stored locally and indexed such that each of the keywords points to one or more of the data pages in which the keywords are contained. The keywords and their index associations are locally updated. A central database is utilized to compile and index the locally indexed keywords from each of the local sites, such that each of the keywords in the central database points to one or more local sites from which those keywords came in response to a keyword search initiated at the client station.

40 Claims, 6 Drawing Sheets

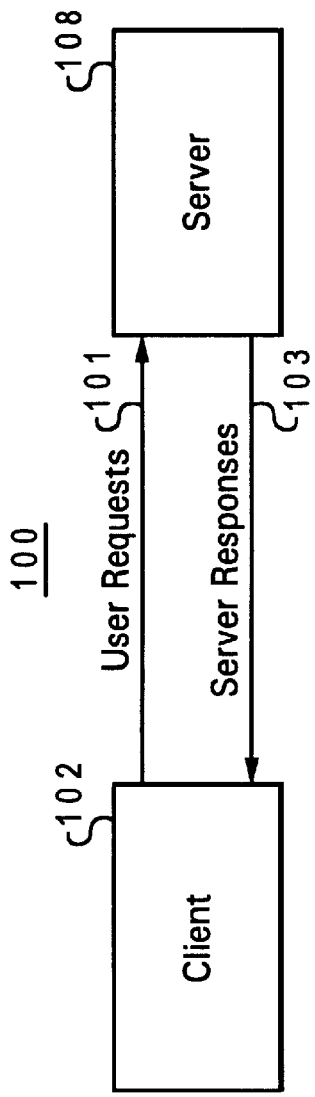
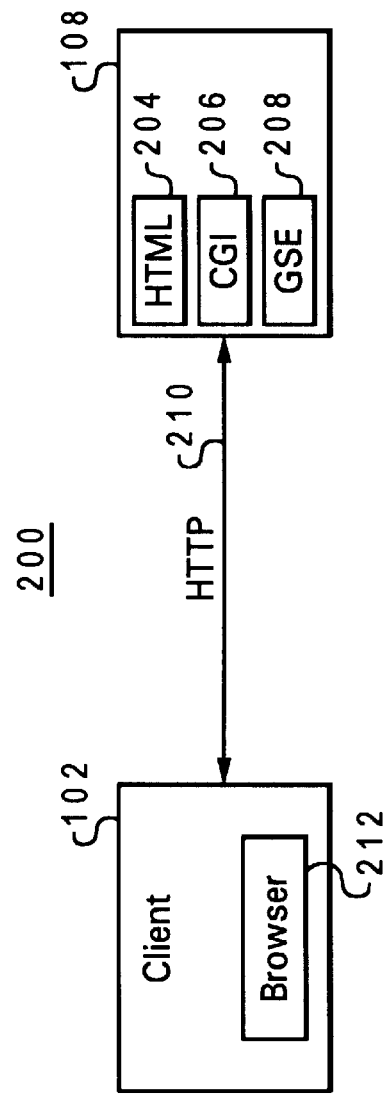

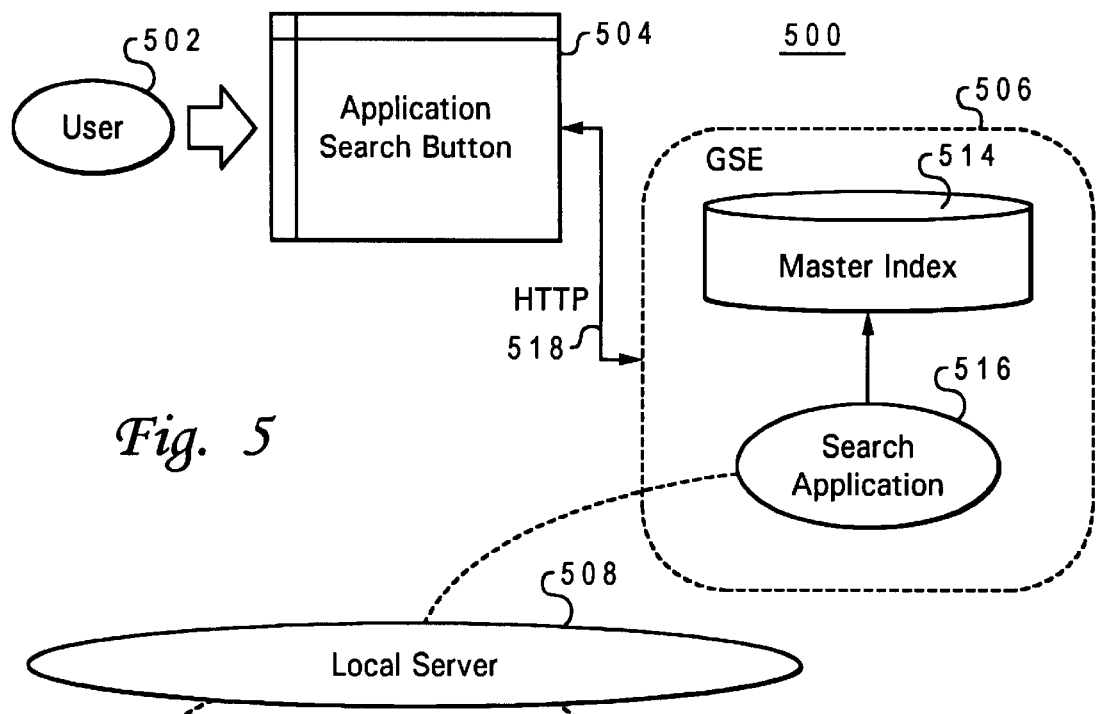
Fig. 5
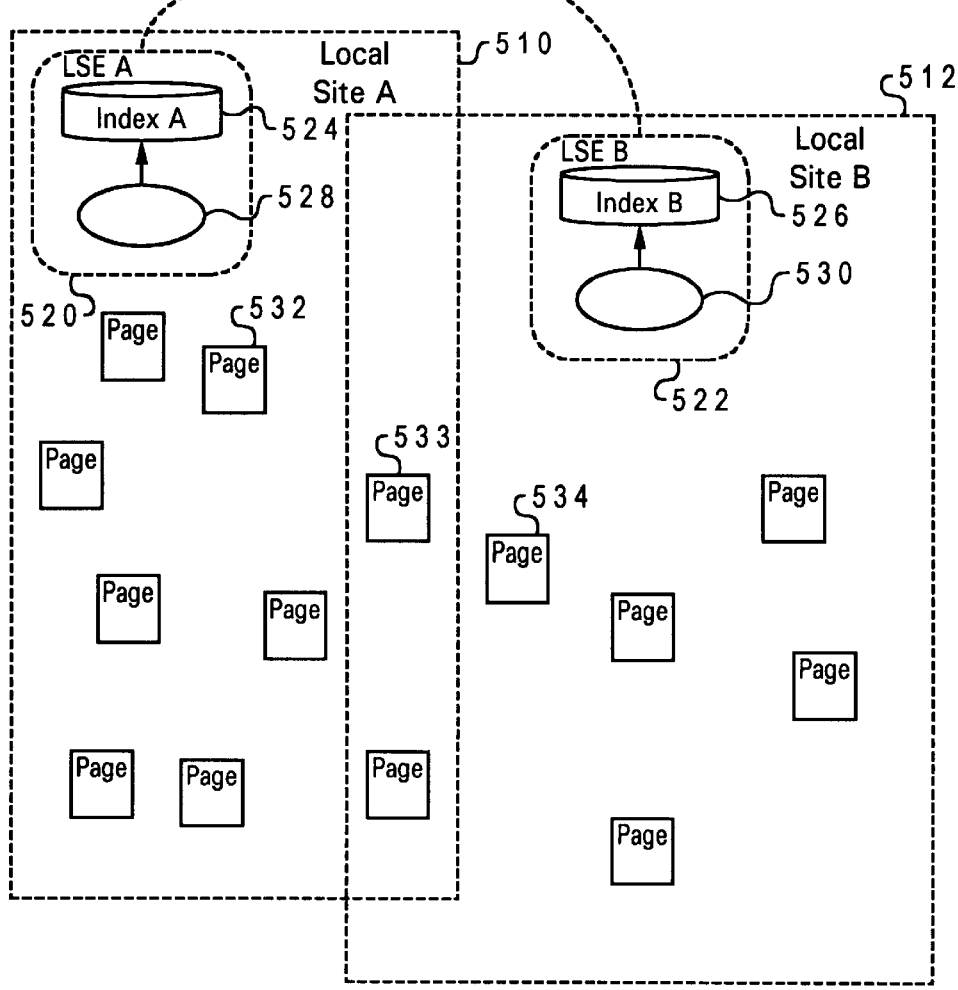

DISTRIBUTED NETWORK SEARCH ENGINE

BACKGROUND OF THE INVENTION

1. Technical Field

The present invention relates to an improved method and system for accessing a network database, and in particular to a method and system for efficiently searching a distributed, hierarchical network database, such as the World Wide Web (WWW). More particularly, the present invention relates to improving network search efficiency by distributing search engine functionality via links among various public or private data networks.

2. Description of the Related Art

Network Access to Information

The development of computerized information resources, such as the Internet, allows users of data-processing systems to link with other servers and networks, and thus retrieve vast amounts of electronic information heretofore unavailable in an electronic medium. The term "Internet" is an abbreviation for "Internetwork," and refers commonly to the collection of networks and gateways that utilize the TCP/IP suite of protocols, which are well-known in the art of computer networking. TCP/IP is an acronym for "Transmission Control Protocol/Internet Protocol," and is a software protocol developed by the Department of Defense for communication between computers. The Internet can be described as a system of geographically distributed computer networks interconnected by computers executing networking protocols that allow users to interact and share information over the networks. Because of such wide-spread information sharing, the Internet has thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential Web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, in contrast to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer system (i.e., a server or Internet Service Provider (ISP)).

A request by a user for news or other information can be sent by a client application program to a server. A server is typically a remote computer system accessible over the Internet or other telecommunications medium. The server scans and searches for raw (e.g., unprocessed) information sources (e.g., newswire feeds or newsgroups). Based upon such requests by the user, the server presents filtered electronic information as server responses to the client process. The client process may be active in a first computer system communicating with the server process which is active in a second computer system, over a telecommunications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "Web," includes those servers adhering to this standard (i.e., HTTP) which are accessible to clients via a computer or data-processing system network address such as a Universal Resource Locator (URL). The network address can be referred to as a Universal Resource Locator address. The client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "Web pages" constructed from a Hypertext Markup Language (HTML), or other server-generated data. Each Web page can also be referred to simply as a "page."

Conventional Search Engine Infrastructure

The evolution of personal computers over the last decade has accelerated the Web and Internet toward useful everyday applications. The graphical portion of the World Wide Web itself is usually stocked with more than twenty-two million "pages" of content, with over one million new pages added every month. Readily accessible computer software applications such as Internet "search engines" provide a means for Internet users to track down sites at which information on a topic of interest can be found. A person may type in a subject or key word which the search engine utilizes to locate a list of pertinent network sites (i.e., Web sites) and Web pages. Thus, with "home pages" published by thousands of companies, universities, government agencies, museums, and municipalities, the Internet can be an invaluable information retrieval resource. The market for Internet access and related applications is expanding at an explosive pace.

All search engine applications available today are equipped with a search-and-find facility that is accessed when a user types in a requested search item and "clicks" on the application's 'Search' button. The data sought may potentially be stored at as many as tens of thousands of Web pages within thousands of network sites. Each of these Web pages may include hypertext links which point to other sites and/or pages at which related information may be found. The process of searching or browsing the Web is therefore an extremely time consuming and computation intensive multiple recursive process possible covering many thousands of possible Web sites and pages.

Conventional search engines maintain internal indices in which the network addresses of Web sites and pages are associated with particular "keywords". When a user types in one or more keywords during a Web search, the search engine examines its internal keyword index to determine first whether the keyword is present within the index, and if so, the addresses of the pages at which the keyword(s) is/are located. Given the explosive growth of the Internet as an information repository, storing and updating such an index is proving burdensome both in terms of information storage capacity and computation bandwidth.

From the foregoing, it can be appreciated that a need exists for a method and system for strategically distributing the search engine functionality across rapidly growing electronic data networks such as the Internet. If implemented, such a method and system would improve both efficiency and comprehensiveness of distributed data network searches.

SUMMARY OF THE INVENTION

It is therefore an object of the invention to provide an improved information-retrieval method and system.

It is another object of the invention to provide an improved method and system for efficiently searching a distributed, hierarchical network database, such as the World Wide Web (WWW).

It is a further object of the invention to improve network search efficiency by distributing search engine functionality via links among various public or private data networks.

The above and other objects are achieved as is now described. A method and system are disclosed for facilitating a keyword search request initiated at a client station within a multilevel data network, wherein the multilevel data network includes multiple local sites each containing multiple data pages. Multiple keywords from each of the data pages within the local sites of the multilevel data network are stored locally and indexed such that each of the keywords points to one or more of the data pages in which the keywords are contained. The keywords and their index associations are locally updated. A central database is utilized to compile and index the locally indexed keywords from each of the local sites, such that each of the keywords in the central database points to one or more local sites from which those keywords came in response to a keyword search initiated at the client station.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1 illustrates a client/server architecture for implementing the method and system of the present invention;

FIG. 2 depicts a distributed search engine architecture in accordance with the method and system of the present invention;

FIG. 5 is a high-level block diagram depicting distribution of search engine functionality among various network elements in accordance with the method and system of the present invention;

DETAILED DESCRIPTION OF A PREFERRED EMBODIMENT

The present invention harnesses the distributed, hierarchical nature of existing Internet infrastructure as embodied by Web servers, Internet Service Providers (ISPs), and Web sites, to provide an improved method and system for performing a network search. Such a method and system greatly improve both the precision and comprehensiveness of network searches.

Conventional search engine applications maintain a centralized keyword index which consumes considerable space and requires frequent and time consuming updates. The problem of traffic overload on conventional search engines caused by such centralized functionality can be eliminated by first migrating and distributing a portion of the searching and indexing functionality to local sites and servers. In one embodiment of the present invention, local sites support local search engines which perform indexing of all pages maintained at each respective site. A global, top-level search engine maintains and periodically updates its own master index. During such updates, the global search engine incorporates information from the locally maintained indices at each Web site.

In an alternate embodiment, the global search engine would retrieve only the Internet Protocol (IP) address of the local sites associated with word-to-page links relating to the searched words. In this manner, when a user commences a search, the global search engine responds by providing a list of sites (site addresses) rather than page addresses. The user may then have the option of visiting sites recovered and displayed from the search and commence a localized search utilizing a local search engine which references its own internal local index as a more accurate and efficient guide for finding the page(s) meeting the search criteria.

Global search engine (GSE) receives search requests from users in a conventional manner—by matching keywords specified by the user to index entries pointing to addresses within its own internal index. Each 'Search' button or hypertext search link in the application now points to a particular HTML search index file residing on the server.

Figure 3:
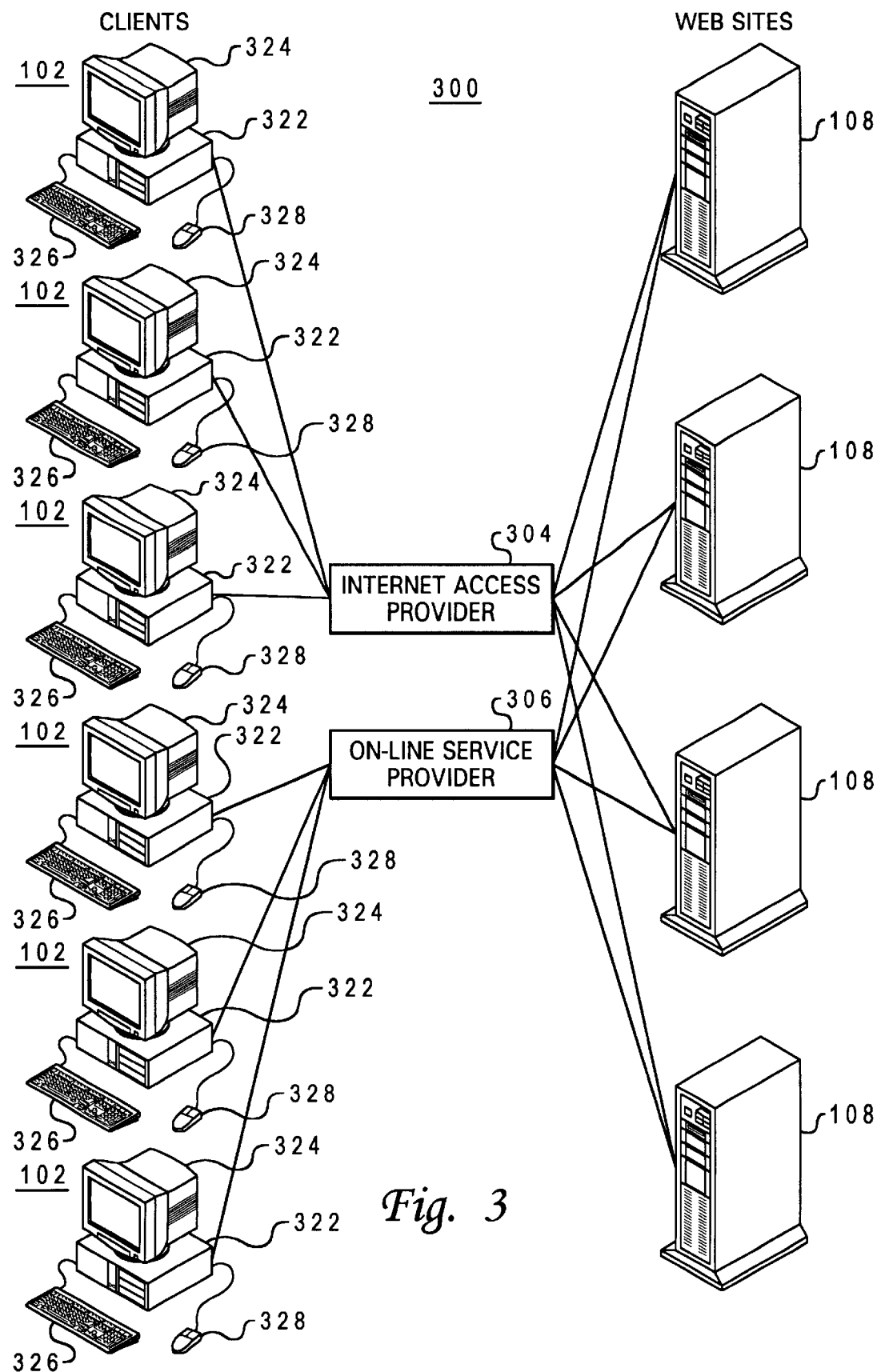
FIG. 3 illustrates a computer network with which the method and system of the present invention may be practiced.

In FIG. 1, FIG. 2, and FIG. 3, like parts are indicated by like reference numerals. FIG. 1 illustrates a client/server architecture 100 for implementing the method and system of the present invention. In FIG. 1, user search requests 101 are delivered by a client application program 102 to a server 108. Server 108 can be a remote computer system accessible over the Internet or other communications medium. Server 108 performs scanning and searching of raw (e.g., unprocessed) information sources (e.g., newswire feeds or newsgroups) and, based upon these user requests, presents the filtered electronic information as server responses 103 to the client process. The client process may be active in a first computer system, and the server process may be active in a second computer system and communicate with the first computer system over a communications medium, thus providing distributed functionality and allowing multiple clients to take advantage of the information-gathering capabilities of the server.

With reference now to FIG. 2, there is depicted a distributed search engine architecture in accordance with the method and system of the present invention. The client and server are processes which are generated from a high-level programming language (e.g., PERL) that is operative within two computer systems. The client and server processes are interpreted and executed by the computer systems at runtime (e.g., a workstation), and it can be appreciated by one skilled in the art that they may be implemented in a variety of hardware devices, either programmed or dedicated.

Client 102 and server 108 communicate using the functionality provided by Hypertext-Transfer Protocol (HTTP). The term Web, as utilized herein, includes all servers adhering to the HTTP standard, which are accessible to clients via a Universal Resource Locator. Active within client 102 is a first process, browser 212, which establishes the connections with server 108, and presents information to the user. Any number of commercially or publicly available browsers may be used, in various implementations.

Server 108 executes the corresponding server software which presents information to the client in the form of HTTP responses 210. The HTTP responses 210 correspond with the Web pages represented using Hypertext Markup Language (HTML) or other data which is generated by the server. For example, under the Mosaic-brand browser, in addition to HTML functionality 204 provided by server 108 (i.e., display and retrieval of certain textual and other data based upon hypertext views and selection of item(s)), a Common Gateway Interlace (CGI) 206 is provided which allows the client program to direct server 108 to commence execution of a specified program contained within server 108. This may include a search engine which scans received information in the server for presentation to the user controlling the client. Using this interface, and HTTP responses 210, the server may notify the client of the results of that execution upon completion.

FIG. 3 illustrates a computer network with which the method and system of the present invention may be practiced Computer network 300 is representative of the Internet, a known computer network based on the client-server model discussed earlier. Conceptually, the Internet includes a large network of servers 108 which are accessible by clients 102, typically users of personal computers, through some private Internet-access provider 304 (e.g., such as Internet America) or an on-line service provider 306 (e.g., such as America On-Line, Prodigy, Compuserve, and the like). Each of the clients 102 may run a "browser," which is a known software tool used to access servers 108 via the access providers. Each server 108 operates a so-called Web site which supports files in the form of documents and pages. A network path to servers 108 is identified by a Universal Resource Locator having a known syntax for defining a network collection.

Clients 102 are depicted as personal computers, each including a system unit 322, a video display terminal 324, an alphanumeric input device (i.e., keyboard 326) having alphanumeric and other keys, and a mouse 328. An additional input device (not shown), such as a trackball or stylus, also can be included with clients 102. Clients 102 can be implemented utilizing any suitable computer, such as an IBM Aptiva computer, a product of International Business Machines Corporation, located in Armonk, N.Y. "Aptiva" is a registered trademark of International Business Machines Corporation.

Although the clients 102 in FIG. 3 are depicted as personal computers, a preferred embodiment of the present invention may be implemented in other types of data-processing systems, such as, for example, intelligent workstations or mini-computers. Clients 102 also preferably includes a graphical user interface that resides within a machine-readable media to direct the operation of clients 102.

Figure 4:
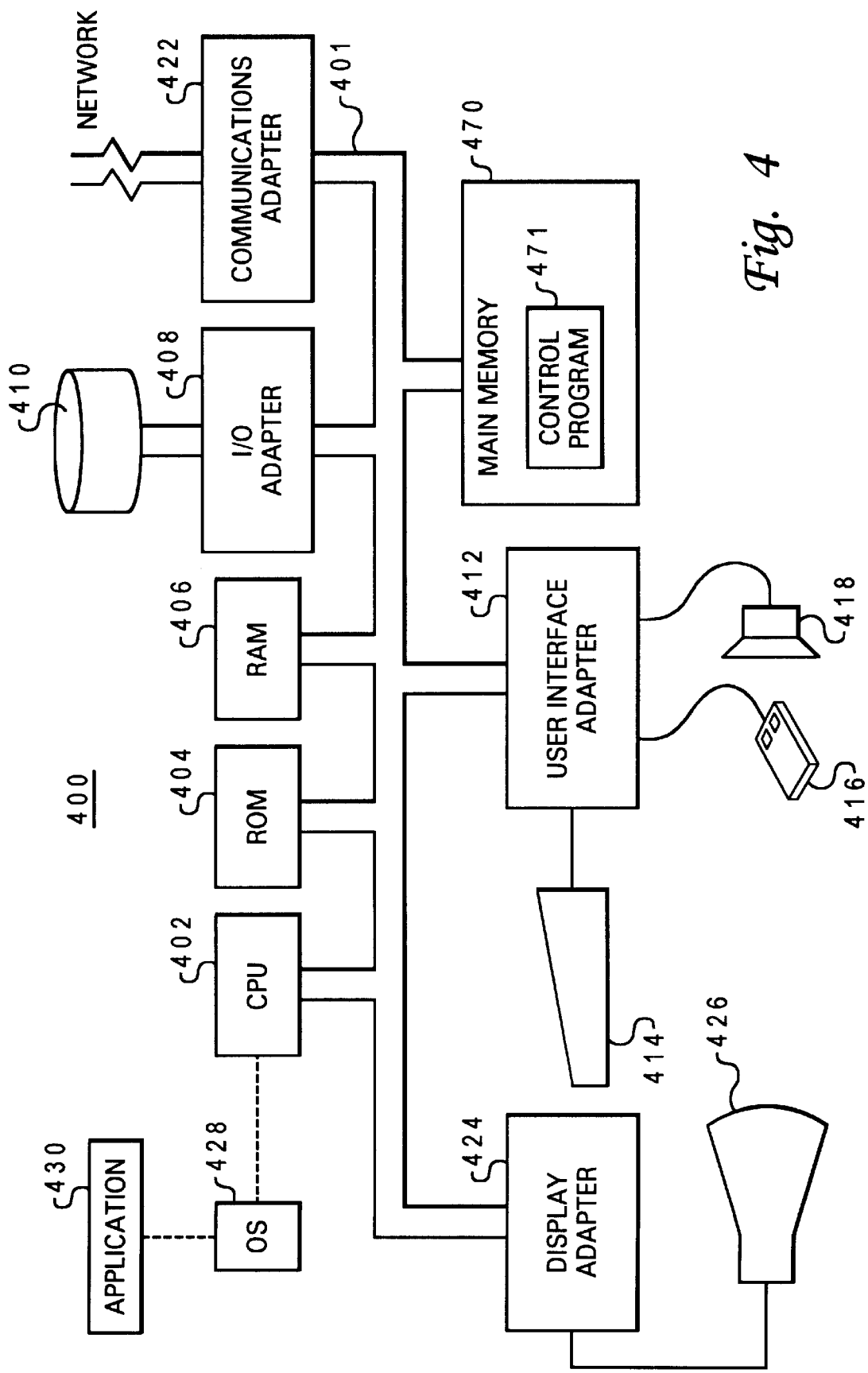
FIG. 4 depicts a data processing system with which the method and system of the present invention may be implemented.

Turning now to FIG. 4, there is illustrated a typical data processing system 400 in which a preferred embodiment of the present invention may be implemented as one of clients 102. A central processing unit (CPU) 402, such as one of the PC microprocessors available from International Business Machines Corporation (IBM), is provided and interconnected to various other components by system bus 401. An operating system 428 runs on CPU 402 and provides coordination and control among the various components of data processing system 400. Operating system 428 may be one of the commercially available operating systems such as OS/2™ operating system available from IBM. A program application 430 operates in conjunction with operating system 428, and provides output calls to operating system 428 which implement the various functions to be performed by application 430.

A read only memory (ROM) 404 is connected to CPU 402 via bus 401 and includes the basic input/output (BIOS) that controls basic computer functions. A random access memory (RAM) 406, I/O adapter 408 and communications adapter 422 are also interconnected to system bus 401. It should be noted that software components, such as operating system 428 and application 430, are loaded into RAM 406, which operates as the main memory for data processing system 400. I/O adapter 408 may be a small computer system interface (SCSI) adapter that communicates with a disk storage device 410. Communications adapter 422 interconnects bus 401 with an external network, enabling data processing system 400 to communicate with other such systems over a local area network (LAN) or wide area network (WAN), such as the Internet. An exemplary WAN would comprise one or more of servers 108, ISP 304, or on-line service provider 306. I/O devices are also connected to system bus 401 via a user interface adapter 412 and a display adapter 424 utilizing various components such as a digital-to-analog converter (not depicted) and the like. By utilizing the aforementioned I/O devices, a user is capable of inputting information to data processing system 400 through input devices such as a keyboard 414 or a mouse 416, and receiving output information from the system from a speaker 418 or a visual display screen 426.

As further illustrated in FIG. 4, a main memory 470 is connected to system bus 401, and includes a control program 471. Control program 471 resides within main memory 470 and contains instructions that when executed on CPU 402 carry out the operations depicted in the logic flowchart of FIGS. 7 and 8 described herein. The computer program product also can be referred to as a program product. Control program 471 can support a number of Internet-access tools including, for example, an HTTP-compliant Web "browser." Known browser software applications include: Netscape Navigator® ("Netscape"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill. The present invention is designed to operate with any of these known or developing Web browsers, in order to achieve the display of information associated with search engine applications launched from the Internet.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Communications adapter 422 may be provided by a network card (not depicted) which can be connected to system bus 401 in order to link data processing system 400 to other data-processing system networks in a client/server architecture or to groups of computers and associated devices which are connected by communications facilities. Those skilled in the art will appreciate that the hardware depicted in FIG. 4 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Distributed Search Engine Architecture

Figure 6:
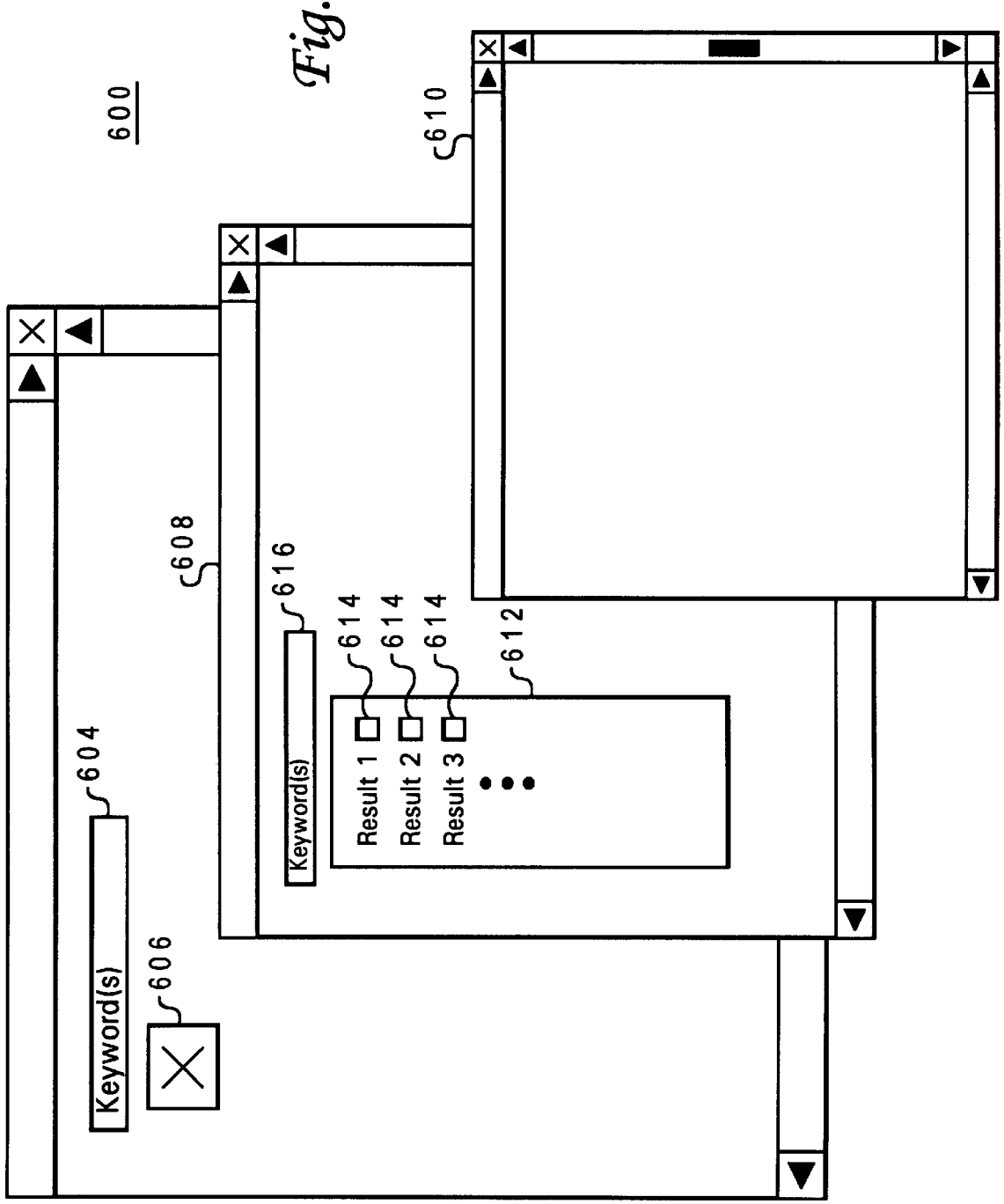
FIG. 6 is a diagram depicting a search engine GUI utilized in accordance with the method and system of the present invention.
Figure 7:
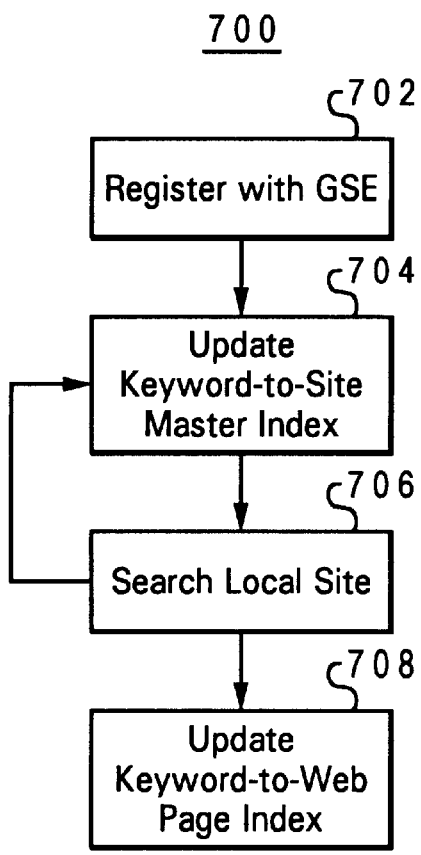
FIG. 7 is a high-level flow diagram illustrating steps performed with a multilevel network database while maintaining a distributed search engine in accordance with the method and system of the present invention.

Based on the multi-layer nature of the World Wide Web, a distributed search engine (DSE) infrastructure is proposed which leverages the hierarchical nature of data organization on the Web. FIGS. 5 through 7 illustrate possible implementations of such a DSE in which local search engines assume local indexing responsibilities. Central to the proposed DSE are the following three key innovations: (1) implementing local search engines at local servers or sites which maintain and update local indices; (2) a top-level global search engine which utilizes such local indexing to point to servers or sites in response to keyword search requests; and, (3) a finer user search option granularity consisting of at least the following two-step search process: a) locating sites and/or servers from a global index; b) searching one or more local sites utilizing localized search engines in response to step a).

Turning now to FIG. 5, there is depicted a block diagram of a server-centric search engine deployment scheme of the DSE of the present invention. A user 502 initiates operation of a DSE 500 by first entering one or more search keywords and then activating a search execution button 504. The user initiation can be accomplished through a variety of user interface devices such as keyboard 414 or mouse 416 of data processing system 400. In one embodiment of the present invention, search execution button 504 is displayed within a graphical user interface (GUI) such as GUI window 600 of FIG. 6. Upon activation of search execution button 504, the user's search request is converted into a hypertext data format and the newly converted hypertext search request is transmitted to a global search engine (GSE) 506.

As illustrated in FIG. 5, global search engine 506 includes a master index 514 which contains a central keyword database (not depicted). This central keyword database is periodically updated via search application program 516 from data retrieved by servers such as local server 508. The periodic updates from search application program 516 to the keyword database within master index 514 may occur in response to, or independent from a keyword search request by user 502. In one such scenario, user 502 attempts to obtain information relating to a particular topic by specifying one or more search keywords within search executable 504. If the keywords entered by user 502 are currently unavailable within the centralized keywords database of master index 514, user 502 may then launch an advanced search request by activating an "advanced search" option within search executable 504. This advanced search request will be automatically converted as usual into a hypertext data format and forwarded from search application program 516 to one or more local search engines (LSEs) served by local server 508. In the depicted example, local server 508 supports LSE 520 and LSE 522 which are associated with local network sites 510 and 512 respectively. It should be noted that the depiction of a single local server serving two local sites is provided in FIG. 5 for the sake of simplicity and clarity of explanation. Many additional local servers serving one or more sites may also be registered with GSE 506 consistent with the spirit and scope of the present invention.

If the keywords entered by user 502 are currently stored within the centralized keyword database of master index 514, GSE 506, supported from a network server, retrieves and delivers resultant data from master index 514 into a "search result" GUI within the client station on which search executable 504 resides. In a preferred embodiment of the present invention, such resultant data includes the identity and network addresses of network sites containing one or more of the searched keywords. Therefore, in response to receiving a keyword search request from search executable 504, GSE 506 "points to" sites which are associated with the selected keywords within master index 514 and provides these results to user 502 via a search result GUI which is described in greater detain with reference to FIG. 6.

As depicted in FIG. 5, local sites 510 and 512 are World Wide Web (WWW) sites each comprising a collection of related HTML documents commonly referred to as "Web pages". Web pages 532 and 534 are, contained within sites 510 and 512 respectively, while Web page 533 is shared by both. The depicted Web pages within sites 510 and 512 are documents consisting of an HTML file which have associated files for scripts and graphics in a particular directory or machine (not depicted). Such Web pages often include hypertext links to other Web pages.

In accordance with an important feature of the present invention, each of local sites 510 and 512 have an associated local database which maintains a list of keywords compiled from within each site. LSEs 520 and 522 include such keyword databases within a pair of local indices 524 and 526. LSEs 520 and 522 also include local search application programs 528 and 530 which serve to update the list of keywords maintained within the keyword databases of local indices 524 and 526. In a preferred embodiment of the present invention, local indices include processing means for indexing the current keyword lists such that each of the keywords is associated with one or more of the multiple Web pages within each respective site. In this manner, the distributed search engine of the present invention delegates much of the indexing functionality conventionally provided by the top level search engine to local search engines residing on local servers. This improvement is increasingly needed as the recursive nature of mapping keywords to multiple URLs has caused "top-level indexing" to become nearly unmanageable.

The updated data within local indices 524 and 526 are converted into a suitable hypertext format and delivered automatically, or in response to a user request to GSE 506 via local server 508. In the latter case user 502 may access the most recent keyword search information by utilizing an "advanced search" feature within a graphical user interface (GUI) such as that illustrated in FIG. 6. Such an user-driven update may be performed even before a periodic update of the keyword database of master index 514 has occurred.

The clients and servers depicted in FIGS. 1, 2, and 3, typically display browsers and other Internet data for a user via a graphical user interface (GUI) such as GUI 600 illustrated in FIG. 6. GUI 600 utilizes a well-known type of display format that enables a user to choose commands, start programs, and see lists of files and other options by pointing to pictorial representations (icons) and lists of menu items on the screen. Choices can be activated generally either with a keyboard or a mouse. Internet services may be accessed within GUI 600 by specifying a unique network address (i.e., URL). The URL address has two basic components, the protocol to be used and the object pathname. For example, the URL address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address). A "Web browser" is a well known type of GUI which may be utilized to support the utilities of GUI 600 in accordance with the teachings of the present invention.

As illustrated in FIG. 6, GUI 600 comprises a keyword entry field 604, a search application button 606, and a search result window 608. Search application button 606 is linked to a centralized search database such as master index 514, such that upon selection of search application button 606, the GSE, such as GSE 506, retrieves and delivers data from the centralized database into search result window 608. Selection of search executable 504 thus initiates a top-level search in which GSE 506 is provided with search instructions in accordance with the keywords typed into keyword entry field 604. Search result window 608 displays the search results in a search result field 612. As depicted in FIG. 6, and in a preferred embodiment of the present invention, the results displayed within search result field 612 includes a list of local sites hypertext links each having an associated local site search executable button 614. An additional keyword entry field 616 may also be provided within search result window 608. Each of the local search site executable buttons is linked to at least one of the local sites served by the local search engines of the present invention. In this manner the present invention provides the user with the option of either visiting a selected site directly, or conducting a further keyword search of one or more of the local sites displayed within search result window 608. Results from such localized searches are displayed within a secondary search result window 610 which is linked to local indices maintained and updated by the local search engines (local indices 524 and 526 of FIG. 5, for example), such that upon selection of a local site search executable 614, the corresponding local search engine retrieves and delivers search results from the local index to secondary search result window 610. It should be noted that these secondary results will include links to specified Web pages within the local sites.

If, as mentioned with reference to FIG. 5 above, the requested keywords are not currently within master index 514, or the search result is otherwise deemed insufficient by user 502, user 502 may select a flag (not depicted) within GUI 600 which will then be automatically forwarded to search application 516 and automatically relayed to local search engines 520 and 522. Local server 508, from which the local search engines operate, takes note of the flag, and facilitates the hypertext data transfers necessary to commence local searching by LSEs 520 and 522. In this manner on-demand local searching may be initiated from GUI 600 resulting in a manual update of master index 514 and search results provided to a search result window within GUI 600.

FIG. 7 is a high-level flow diagram 700 illustrating steps performed with a multilevel network database while maintaining a distributed search engine in accordance with the method and system of the present invention. As depicted step 702 of diagram 700, the distributed search engine originates with local Web sites registering with a global search engine (GSE) such as GSE 506 of FIG. 5. After being registered, and as shown at step 704, each of these "member sites" provides or otherwise makes available to the GSE, a list of its own keywords which indexed within a master index such as master index 514. In a preferred embodiment of the present invention, such indexing entails associating each keyword with the network address of its local site or server. In this manner, a single client search request to a GSE results in user access to a centralized and comprehensive list of keyword references.

The lists of keywords may be periodically updated automatically or, as illustrated by steps 706 and 704, such updates may occur in response to local searches of one or more local sites conducted by a local search engine (LSE). Proceeding to step 708, the local searching feature depicted at step 706 also permits updates for indices maintained in association with local sites and/or local servers. These local indices associate keywords contained within each site to the Web page addresses at which the keywords or related information can be found. Such local index maintenance results in a dramatic time and resource bandwidth savings on the part of the GSE while continuing to provide a comprehensive search engine index.

Figure 8:
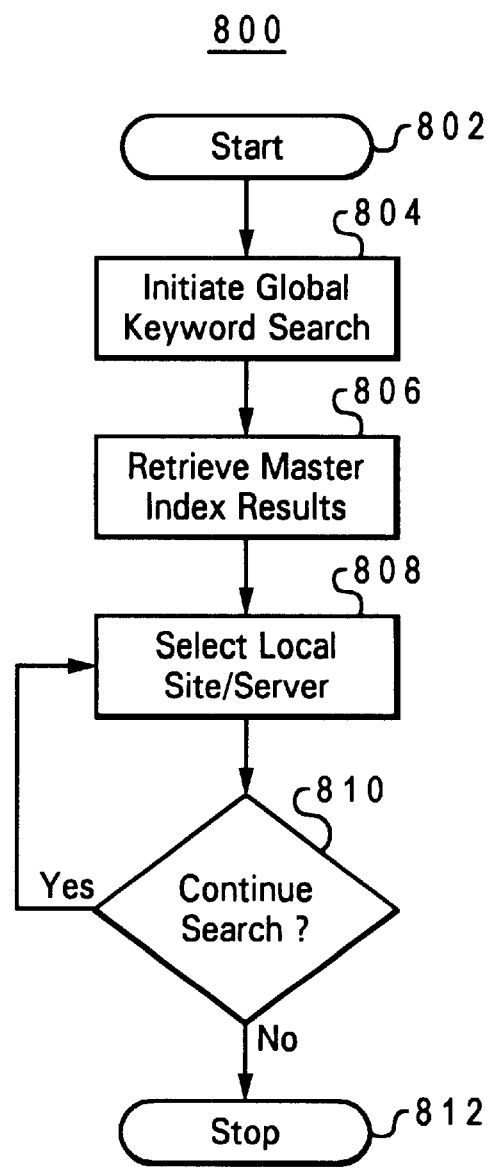
FIG. 8 is a high-level logic diagram depicting steps performed by network data processing devices while performing a keyword search in accordance with the method and system of the present invention.

FIG. 8 is a high-level logic diagram 800 depicting steps performed by network data processing devices while performing a keyword search in accordance with the method and system of the present invention. Following start block 802, a keyword search commences as depicted at step 804. A keyword search request is initiated by a user from a client station such as data processing system 400. A typical search request such as that depicted at step 804 is initiated utilizing a keyword selection field (keyword entry field 604, for example), in conjunction with a search engine executable such as search application button 606. A GSE receives the search request initiated as shown at step 804 and retrieves master index results in response thereto as illustrated at step 806. As explained with reference to master index 514 of FIG. 5, the master index maintains a comprehensive list of keywords and associates each keyword with one or more local sites.

The results retrieved from the master index are presented within a search result GUI as depicted in FIG. 6. In these results, the master index utilizes the searched keywords to point to one or more local sites and/or servers. As shown at step 808 a user may locate Web relevant Web pages by selecting a local search option associated with each of the local site "hits" retrieved at step 806. The selection depicted at step 808 may be performed by selecting a local site search executable such as local site search executable buttons 614 of FIG. 6. Finally, steps 810, 808, and 812 illustrate the process by which a user may continue searching the local sites identified at step 806.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to FIGS. 5, 6, 7, and 8 can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. For example, the present invention is applicable to other communication networks besides the Internet, including "intranets" (i.e., networks internal to particular organizations). It is therefore contemplated that such modifications can be made without departing from the spirit or scope of the present invention as defined in the appended claims.

What is claimed is:

1. A method for facilitating a keyword search request initiated at a client station within a multilevel data network, wherein said multilevel data network includes a plurality of local sites each containing a plurality of data pages, said method comprising the steps of:

within each of said plurality of local sites, indexing keywords from said plurality of data pages within a local database, such that within said local database, each of said keywords points to one or more of said plurality of data pages;

compiling and indexing said keywords from each local database within a central database, such that within said central database, each of said keywords points only to at least one of said local sites in response to a keyword search request initiated at said client station.

2. The method of claim 1, wherein said multilevel data network further comprises a collection of interlinked hypertext documents, and wherein said compiling and indexing steps are performed utilizing a hypertext transfer protocol.

3. The method of claim 1, wherein each of said plurality of local sites is served by a local server, and wherein said compiling and indexing step comprises the step of associating each of said keywords with one or more of said local servers.

4. The method of claim 1, wherein said compiling and indexing keywords from said plurality of data pages into a local database, further comprises the step of individually searching each of said local databases for occurrences of said keywords.

5. The method of claim 1, wherein said multilevel data network further comprises a global search engine accessible from a search graphic user interface (GUI) having a search executable and a search result window within said client station, said method further comprising the steps of:

receiving said keyword search request at said global search engine; and retrieving and delivering data from said central database into said search result window in response to said receiving step.

6. The method of claim 5, wherein said global search engine is served by a network server, and wherein said retrieving step comprises the step of pointing to at least one of said local sites utilizing said network server.

7. The method of claim 5, wherein said search result window further comprises a local site search executable linked to said local search engines, said method further comprising the step of initiating a search by at least one of said local search engines of at least one of said local sites.

8. The method of claim 5, wherein said keyword search request includes the step of selecting a keyword search request from an application search button within said search GUI, said search executable including a HTTP pathname.

9. The method of claim 5, wherein said keyword search request comprises the step of converting said keyword search request into a data format readable by said multilevel data network.

10. The method of claim 1, further comprising locally updating said plurality of keywords within each of said local indices.

11. The method of claim 10, wherein said multilevel data network further comprises local search engines associated with each of said plurality of local sites, and wherein said step of updating said keywords contained within each of said local indices is performed utilizing said local search engines.

12. The method of claim 11, further comprising the step of installing said local search engines as HTML search files on at least one local server.

13. A method for facilitating a keyword search request initiated at a client station within a multilevel data network, wherein said multilevel data network includes a plurality of local sites each containing a plurality of data pages, said method comprising the steps of:
- within each of said plurality of local sites, indexing keywords from said plurality of data pages within a local database, such that within said local database, each of said keywords points to one or more of said plurality of data pages;
- compiling and indexing said keywords from each local database within a central database, such that within said central database, each of said keywords points only to at least one of said local sites;
- responsive to receiving an initial keyword search request from a graphical user interface on said client station, searching said central database for local sites indexed in accordance with the contents of said initial keyword search request;
- returning a list of one or more of said local sites indexed in accordance with the contents of said initial keyword search request to a search result window within said graphical user interface, wherein said search result window includes a keyword entry field and an independent search request selection option field associated with each entry of said returned one or more local sites; and
- responsive to receiving a subsequent keyword search request issued in accordance with the contents of said search result window keyword entry field and selection of one or more of said independent search request selection fields, searching said local databases for data pages indexed in accordance with the contents of said subsequent keyword search request.

14. A system for facilitating a keyword search request initiated at a client station within a multilevel data network, wherein said multilevel data network includes a plurality of local sites each containing a plurality of data pages, said system comprising:
- a plurality of local databases each uniquely associated with each of said local sites for indexing keywords from said plurality of data pages, such that within each of said local databases said keywords point to one or more of said plurality of data pages;
- a central database for compiling and indexing said keywords from each of said local databases, such that within said central database, each of said keywords points only to at least one of said local sites; and
- a global search engine for accessing said central database to point to at least one of said plurality of local sites in response to a keyword search request initiated at said client station, such that said global search engine may provide a comprehensive search response to said keyword search request.

15. The system of claim 14, wherein each of said local databases further comprises a local index for associating each of said keywords compiled from within each local site with one or more of said plurality of data pages contained within each respective local site.

16. The system of claim 14, wherein said central database further comprises a master index for associating each of said keywords with one or more sites among said plurality of local sites.

17. The system of claim 14, wherein said multilevel data network comprises a collection of interlinked hypertext documents.

18. The system of claim 17, wherein said plurality of data pages are Web pages.

19. The system of claim 14, wherein said global search engine and said local search engines utilize a hypertext data format.

20. The system of claim 14, wherein each of said local sites is served by a local server at which an associated local search engine resides as an off-loaded search engine application.

21. The system of claim 20, wherein said central database further comprises a master index for associating each of said keywords with one or more of said servers which serve said local sites.

22. The system of claim 20, wherein said local servers serving each of said local sites support and maintain said local databases.

23. The system of claim 14, wherein said global search engine comprises a search graphical user interface (GUI) which resides at said client station and which includes a keyword entry field and a search executable.

24. The system of claim 23, wherein said global search engine further comprises a search result window within said search GUI and linked to said central database, such that upon selection of the search executable, said global search engine retrieves and delivers data from said central database into said search result window.

25. The system of claim 24, wherein said search result window further comprises a local site search executable linked to at least one of said local search engines for initiating a search by said at least one local search engine of one or more of said local sites.

26. The system of claim 25, wherein said search result window further comprises a secondary search result window that is linked to said local database, wherein upon selection of said local site search executable, said local search engine retrieves and delivers data from said local database into said secondary search result window.

27. The system of claim 14, further comprising a local search engine associated with each of said local sites for updating said list of keywords contained within each of said local databases.

28. A system for facilitating a keyword search request initiated at a client station within a multilevel data network, wherein said multilevel data network includes a plurality of local sites each containing a plurality of data pages, said system comprising:
- a plurality of local databases each uniquely associated with each of said local sites for indexing keywords from said plurality of data pages, such that each of said keywords points to one or more of said plurality of data pages;
- a central database for compiling and indexing said keywords from each of said local databases, such that within said central database, each of said keywords points only to at least one of said local sites; and
- a global search engine for:
  - responsive to receiving an initial keyword search request from a graphical user interface on said client station, searching said central database for local sites indexed in accordance with the contents of said initial keyword search request; and
  - returning a list of one or more of said local sites indexed in accordance with the contents of said keyword search request to a search result window within said graphical user interface, wherein said search result window includes a keyword entry field and an independent search request selection field associated with each entry of said returned one or more local sites; and local search engines responsive to receiving a subsequent keyword search request issued in accordance with the contents of said search result window keyword entry field and selection of one or more of said independent search request selection fields, for searching said local databases for data pages indexed in accordance with the contents of said subsequent keyword search request.

29. A computer program product stored in signal bearing media for facilitating a keyword search request initiated at a client station within a multilevel data network, wherein said multilevel data network includes a plurality of local sites each containing a plurality of data pages, said program product comprising:

instruction means stored in signal bearing media for, within each of said plurality of local sites, indexing keywords from said plurality of data pages into local databases, such that within said local databases, each of said keywords points to one or more of said plurality of data pages;

instruction means stored in signal bearing media for compiling and indexing said keywords from each of said local databases into a central database, such that within said central database, each of said keywords points only to at least one of said local sites in response to a keyword search request initiated at said client station.

30. The program product of claim 29, wherein said multilevel data network further comprises a collection of interlinked hypertext documents, and wherein said instruction means for compiling and indexing utilize a hypertext transfer protocol.

31. The program product of claim 30, wherein each of said plurality of local sites is served by a local server, and wherein said instruction means for compiling and indexing comprises instruction means for associating each of said keywords with one or more of said local servers.

32. The program product of claim 29, wherein said instruction means for compiling and indexing keywords from said plurality of data pages into a local database, further comprises instruction means for individually searching each of said local databases for occurrences of said keywords.

33. The program product of claim 29, wherein said multilevel data network further comprises a global search engine accessible from a search graphic user interface (GUI) having a search executable and a search result window within said client station, said program product further comprising:

instruction means for receiving said keyword search request at said global search engine; and instruction means for retrieving and delivering data from said central database into said search result window.

34. The program product of claim 33, wherein said global search engine is served by a network server, and wherein said instruction means for retrieving comprises instruction means for pointing to at least one of said local sites utilizing said network server.

35. The program product of claim 33, wherein said search result window further comprises a local site search executable linked to said local search engines, said program product further comprising instruction means for initiating a search by at least one of said local search engines of at least one of said local sites.

36. The program product of claim 33, further comprising instruction means for converting said keyword search request into a data format readable by said multilevel data network.

37. The program product of claim 29, wherein said multilevel data network further comprises local search engines associated with each of said plurality of local sites, and wherein said instruction means for updating said keywords contained within each of said local databases are executed by said local search engines.

38. The program product of claim 27, further comprising instruction means for installing said local search engines as HTML search files on at least one of said local servers.

39. The program product of claim 29, further comprising instruction means stored in signal bearing media for locally updating said plurality of keywords within each of said local indices.

40. A computer program product stored in signal bearing media for facilitating a keyword search request initiated at a client station within a multilevel data network, wherein said multilevel data network includes a plurality of local sites each containing a plurality of data pages, said program product comprising:

instruction means stored in signal bearing media for, within each of said plurality of local sites, indexing keywords from said plurality of data pages into local databases, such that within said local databases, each of said keywords points to one or more of said plurality of data pages;

instruction means stored in signal bearing media for compiling and indexing said keywords from each of said local databases into a central database, such that within said central database, each of said keywords points only to at least one of said local sites;

instruction means stored in signal bearing media responsive to receiving an initial keyword search request from a graphical user interface on said client station, for searching said central database for local sites indexed in accordance with the contents of said initial keyword search request;

instruction means stored in signal bearing media for returning a list of one or more of said local sites indexed in accordance with the contents of said keyword search request to a search result window within said graphical user interface, wherein said search result window includes a keyword entry field and an independent search request selection field associated with each entry of said returned one or more local sites; and instruction means stored in signal bearing media responsive to receiving a subsequent keyword search request issued in accordance with the contents of said search result window keyword entry field and selection of one or more of said independent search request selection fields, for searching said local databases for data pages indexed in accordance with the contents of said subsequent keyword search request.

* * * * *